(12) United States Patent
Yamaoka et al.

(10) Patent No.: US 8,576,062 B2
(45) Date of Patent: Nov. 5, 2013

(54) APPARATUS AND METHOD FOR PROVIDING DRIVING ADVICE

(75) Inventors: Kousuke Yamaoka, Kariya (JP); Ichiro Takeuchi, Handa (JP); Shojiro Takeuchi, Tokyo (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 619 days.

(21) Appl. No.: 12/533,189

(22) Filed: Jul. 31, 2009

(65) Prior Publication Data

US 2010/0026476 A1    Feb. 4, 2010

(30) Foreign Application Priority Data

Aug. 1, 2008    (JP) .................................. 2008-200034

(51) Int. Cl.
*B60Q 1/00*        (2006.01)
(52) U.S. Cl.
USPC ........ 340/457.4; 340/439; 340/459; 701/29.1
(58) Field of Classification Search
USPC ........... 340/438, 439, 425.5, 461, 457, 457.4, 340/459; 701/29, 29.1
See application file for complete search history.

(56) References Cited

U.S. PATENT DOCUMENTS

| 4,708,406 A * | 11/1987 | Takagi et al. ............... 303/116.1 |
| 6,922,622 B2 * | 7/2005 | Dulin et al. ...................... 701/45 |
| 2002/0091473 A1 | 7/2002 | Gardner et al. |
| 2002/0116156 A1 | 8/2002 | Remboski et al. |
| 2002/0120371 A1 | 8/2002 | Leivian et al. |
| 2002/0120374 A1 | 8/2002 | Douros et al. |
| 2002/0151297 A1 * | 10/2002 | Remboski et al. ............ 455/414 |
| 2008/0316009 A1 * | 12/2008 | Nagata .......................... 340/438 |
| 2011/0140874 A1 | 6/2011 | Tauchi et al. |

FOREIGN PATENT DOCUMENTS

| JP | A-2000-247162 | 9/2000 |
| JP | A-2000-351337 | 12/2000 |
| JP | A-2002-319087 | 10/2002 |
| JP | A-2006-347296 | 12/2006 |
| JP | A-2007-284049 | 11/2007 |
| JP | A-2008-163781 | 7/2008 |
| JP | 2010-038647 A | 2/2010 |

OTHER PUBLICATIONS

U.S. Appl. No. 12/533,142, filed Jul. 31, 2009, Tauchi et al.
Office Action mailed May 29, 2012 in corresponding JP Application No. 2008-200034 (and English translation).

* cited by examiner

*Primary Examiner* — Brent Swarthout
(74) *Attorney, Agent, or Firm* — Posz Law Group, PLC

(57) ABSTRACT

A driving advice provision apparatus generates an advice, based on diagnosis performed on multiple diagnosis items regarding the driving condition of the vehicle and based on the diagnosis results from those diagnosis items, and provides the generated advice to the driver. The multiple diagnosis items are classified into different categories according to the diagnosis methods. For the diagnosis items suitable to the comparative evaluation rather than the quantitative evaluation, a diagnosis result A for the previous evaluation section is compared with a diagnosis result B for the current evaluation section for yielding a comparative evaluation and for advice generation, thereby enabling an effective advice generation and provision in terms of diagnosis item category.

10 Claims, 8 Drawing Sheets

USER NAME : JOHN TOYOTA         REAL TIME DIAG

● STATUS / RANK                ● ACCUM PT
        Blue / 1                       1,500 Pt ● ECO LEVEL                    ● UPDATED
        Excellent                      2008/7/30 13:45

● FUEL MILE
        10.2 Km/L

● ADVICE
PREV    SLOWER ACCELERATION WILL IMPROVE ···    NEXT

FIG. 10B

PREV    REDUCE IDLE TIME FOR ···    NEXT

APPARATUS AND METHOD FOR PROVIDING DRIVING ADVICE

CROSS REFERENCE TO RELATED APPLICATION

The present application is based on and claims the benefit of priority of Japanese Patent Application No. 2008-200034, filed on Aug. 1, 2008, the disclosure of which is incorporated herein by reference.

FIELD OF THE INVENTION

The present invention generally relates to an apparatus for providing driving advice for a driver of a vehicle.

BACKGROUND INFORMATION

In recent years, environment-related situations have developed serious problems such as an environmental pollution and a global warming. In the automotive sectors, the reduction of emission gas including carbon dioxide is a matter of growing concern.

Further, safety issues are considered to have importance under the current situation of traffic accidents and the like.

One approach to the above problems is that the vehicle is equipped with more intelligent and sophisticated functions intended to improve the current standard of environment-friendly and safer performance of the vehicle. This approach has been implemented after the awareness to those problems and concerns, and has yielded a certain outcome.

The other approach to the above problems is that the drivers are trained to have improved efficiency in terms of driving the vehicle on a lower fuel consumption rate, with improved safety-related driving skills. Japanese patent documents JP-A-2000-247162 and JP-A-2002-319087 disclose a technique that evaluates/diagnoses the driving condition for providing an advice for the driver of the vehicle.

More specifically, the driving condition evaluation apparatus for the vehicle disclosed in the former patent document evaluates multiple diagnosis items of driving condition by detecting the driving condition and comparing the detected condition value with a reference value. The driving characteristics diagnosis method disclosed in the latter document is that, by collecting vehicle condition information with a control unit on the vehicle, the collected information is diagnosed at an information center after the information is transmitted thereto, and the diagnosis result is then returned to the vehicle side.

However, the apparatus in the former patent document does not consider the priority of the advice provision, that is, on which diagnosis item an advice should be provided, and does not consider at what point of time the advice should be provided.

Further, the technique in the latter patent document accumulates a certain amount of vehicle condition information before transmitting the information to the information center. Therefore, realtime feedback of an advice for the driver is difficult.

Due to the above-described operation scheme, the contents of the provided advice and/or the advice provision timing may not necessarily be appropriate, thereby decreasing the effectiveness of the provided advice.

SUMMARY OF THE INVENTION

In view of the above and other problems, the present disclosure provides an advice provision apparatus that provides a more effective advice for a driver of a vehicle.

In an aspect of the present disclosure, the driving advice provision apparatus includes: an information acquisition unit for acquiring vehicle information that represents a condition of a vehicle; a diagnosis unit for diagnosing on diagnosis items regarding a driving condition of the vehicle based on the vehicle information acquired by the information acquisition unit; an advice generation unit for generating an advice to be provided for a driver of the vehicle based on a diagnosis result by the driving diagnosis unit; a notification unit for notifying the advice for the driver of the vehicle generated by the advice generation unit. The diagnosis items are multiple items of diagnosis, and the diagnosis unit uses a diagnosis method that is suitable for respective items of diagnosis. Further, the advice generation unit notifies the advice at a timing that is suitable for respective items of diagnosis, and the notification unit notifies the generated advice at a time of stopping the vehicle or during a stopping of the vehicle.

Further, the notification unit includes an advice selection unit that at least selects an advice having a high priority assigned to each of the advices in advance, and the notification unit notifies the driver of the vehicle of the advice selected by the advice selection unit in a prioritized manner.

The method for diagnosing a driving condition includes, for example, a method that diagnoses a trend in a certain period, or a method that diagnoses a condition time after time.

More practically, if the operation condition of the accelerator, brake, steering wheel is diagnosed, that is, if the habits of driver's operation are intended to be diagnosed, a method that diagnoses a trend of the operation for a certain duration of time may be suitably employed. On the other hand, if the operation of those devices is safe or not should be diagnosed, a method that diagnoses each of the operation conditions at the moment of operation may be suitably employed.

Further, the diagnosis for determining whether the seat belt is worn may also be suitably performed time after time at each occasion. This is because the diagnosis result can be promptly notified for the driver of the vehicle.

According to the operation scheme of the present disclosure, the diagnosis of the driving condition can be performed, for each of the diagnosis items, in a suitable method, and the diagnosis result is provided for the driver at the right time. That is, for example, the driving habit of the driver is diagnosed at the moment of operation in terms of safety of device operation (e.g., accelerator operation/brake operation/steering wheel operation and the like), for promptly providing an advice (e.g., a warning) for the driver of the vehicle. The warning may be also effective in case that the driver is not putting on the seat belt. That is, the timeliness of the advice provision has its own effects, as well as the appropriate selection of the target of the advice.

Further, the advice is provided at the time of vehicle's stopping, thereby avoiding the distraction of the driver while he/she is concentrating on the driving operation.

Further, the advice selection unit enables the selection of the advice with high priority, thereby contributing to the improvement of the driving skill of the driver.

Further, the advice provision apparatus may be configured in the following manner. That is, the multiple diagnosis items are categorized into different types according to the diagnosis method of each item, and the diagnosis unit performs diagnosis of each item according to the category of each item. Further, the advice generation unit generates the advice for each item at a timing that is suitable for the category of each item. Therefore, the advice provision apparatus can suitably and effectively provide, for the driver of the vehicle, the advice for each of the diagnosis items at the right time.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment of the present disclosure is described based on the drawing.

First Embodiment

Figure 1:
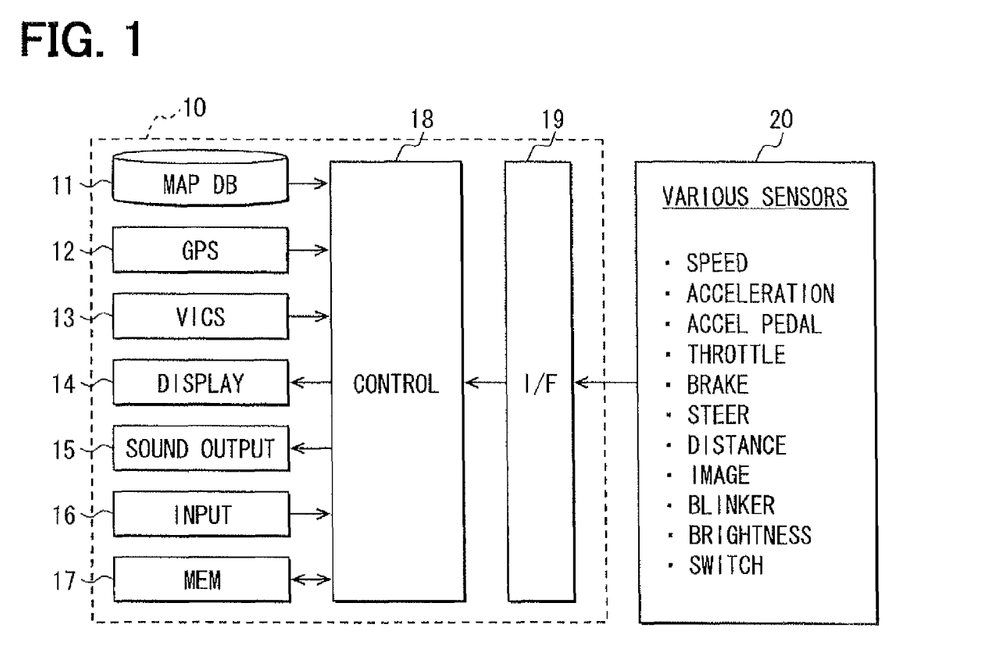
FIG. 1 is a block diagram of the composition of a driving advice provision apparatus in a first embodiment of the present disclosure.

FIG. 1 is a block diagram which shows the structure of a driving advice provision apparatus 1 in the present embodiment.

The driving advice provision apparatus 1 of the present embodiment is mainly composed as a vehicle navigation system 10.

The vehicle navigation system 10 includes a map database 11, a GPS receiver 12, a VICS information receiver 13, a display unit 14, a sound output unit 15, an input unit 16, an external memory 17, a vehicle interface (I/F) 19, and a control circuit 18 for controlling all of the above components.

Hereinafter, each of the components is described.

The map database 11 for at least storing the road data which shows position coordinates and a kind of the road in a certain area (e.g., a national road, a prefectural highway, an expressway and so on).

The GPS receiver 12 is a device which calculates coordinates of the current position of the equipment itself on the ground based on the reception result of a radio signal from GPS satellite (not illustrated) which sails the sky for transmitting the signal conveying orbit information and time information. The calculation result is input to the control circuit 18.

The VICS information receiver 13 is a device which receives traffic information (e.g., accident information, congestion information and the like) from a roadside fixed-station (not illustrated) for the VICS service which is disposed along the road. Received information is input to the control circuit 18.

The display unit 14 includes a liquid crystal display which has a touch panel function. The screen of the display unit 14 displays a map, a searched route, and various other information.

The sound output unit 15 is a device to output, from a speaker (not illustrated), sound represented by the data from the control circuit 18. The sound output includes, for example, a warning sound, an attention-drawing sound, a course guidance voice and the like).

The input unit 16 is a device used by the user for inputting various information. In this case, the input unit 16 may be implemented as an operation button on the display unit 14, or may be implemented as a touch panel disposed on the display screen of the display unit 14.

The external memory 17 stores various programs which are executed by the control circuit 18, and also stores calculation results of the control circuit 18 together with other information.

The vehicle I/F 19 inputs sensor signals from various sensors in the vehicle to the control circuit 18. The various sensors in the vehicle include, for example, a speed sensor, an acceleration sensor, an accel pedal (i.e., an accelerator) sensor, a throttle position sensor, a brake sensor, a steering angle sensor, an inter-vehicle distance sensor, an image sensor, a blinker sensor, an illumination sensor, a various switch sensor, and the like, as a vehicle sensor group 20.

The control circuit 18 calculates a vehicle condition (e.g., speed, acceleration and so on) based on the information from the vehicle sensor group 20 entered through the vehicle I/F 19, and performs a diagnosis with the calculated vehicle condition. In other words, the control circuit 18 performs a diagnosis about the driving condition of the driver. The diagnosis is performed on one or more of the diagnosis items. For each of the diagnosis items, a standard value for the evaluation is determined. The standard value is stored in the external memory 17. The diagnosis results are also stored in the external memory 17.

Further, the external memory 17 stores application programs that are executed by the control circuit 18 for the purpose of generating an advice regarding the environment, safety and the like based on the driving condition diagnosis results of the driver. By using the application programs, the control circuit 18 generates the advice of various types, and notifies the advice to the driver from the display unit 14 and/or the sound output unit 15.

The advice is generated according to the diagnosis items and according to the contents of the diagnosis results. In the present embodiment, all diagnosis items are classified respectively into either of a travel section comparison type, a single section type, a travel time event type and a stop time event type, according to the diagnosis contents.

In the following description, the diagnosis items in each of the respective diagnosis types, the diagnosis method of those types, as well as the advice generation method based on the diagnosis result of those types are described.

⟨Travel Section Comparison Type Diagnosis Item⟩

The diagnosis item of the travel section comparison type is characterized as follows.

The diagnosis item which is classified into the travel section comparison type includes the following items. That is, the diagnosis item suitably evaluated by the relative evaluation is categorized as the travel section comparison type item. More practically, the diagnosis items in this category can be more effectively and suitably evaluated by comparing the same items from different travel sections, rather than evaluated quantitatively by employing calculation of the numbers. In other words, the diagnosis item suitable to a comparative evaluation than an absolute evaluation is gathered in this category.

The diagnosis items such as an eco-lamp diagnosis, an eco-switch diagnosis, an air-conditioner diagnosis, an accel-off diagnosis, an eco-advice diagnosis and the like are included in this category. Details of those diagnoses are described later. The eco-lamp, in this case, indicates a lamp indicator that is lighted when the vehicle is traveling in an economical condition such as a low fuel consumption (i.e., high fuel mileage) condition. Further, the eco-switch is a switch for enabling a low fuel consumption travel mode. In the low fuel consumption travel mode, use of the air-conditioner is suppressed relative to a normal mode, or the amount of fuel injection for the same pedal stroke is suppressed relative to a normal mode, for example, for the purpose of lowering the fuel consumption.

In the eco-lamp diagnosis, a ratio of travel distance is calculated. That is, a travel distance with the eco-lamp lighted condition is divided by the total travel distance for the calculation of the distance ratio. In other words, the ratio of the economical travel distance is calculated in a certain travel section.

In the eco-switch diagnosis, a ratio of travel distance is calculated. That is, a travel distance with the eco-switch turned-on condition is divided by the total travel distance for the calculation of the distance ratio. In other words, the ratio of the low fuel consumption travel distance is calculated in a certain travel section.

In the air-conditioner diagnosis, a ratio of travel time is calculated. That is, a travel time with the air-conditioner used condition is divided by the total travel time for the calculation of the time ratio in a certain travel section.

In the accel-off diagnosis, a ratio of travel distance is calculated. That is, a travel distance with the accelerator turned off (i.e., the stepping stroke of the accelerator is equal to 0) condition (in other words, the travel distance by the inertia of the vehicle body mass) is divided by the total travel distance for the calculation of the distance ratio in a certain travel section. In this case, the stepping stroke of the accelerator is detected based on a signal from the accelerator sensor.

In the eco advice diagnosis, a ratio of travel distance is calculated. That is, a travel distance traveled with a route advice for the traffic congestion avoidance is divided by the total travel distance between a start point and a destination of a travel for the calculation of the distance ratio.

⟨Diagnosis Method for the Diagnosis Item of Travel Section Comparison Type⟩

The diagnosis method for the diagnosis item in the travel section comparison type and the advice generation timing based on the diagnosis result are described with reference to FIG. 2.

Figure 2:
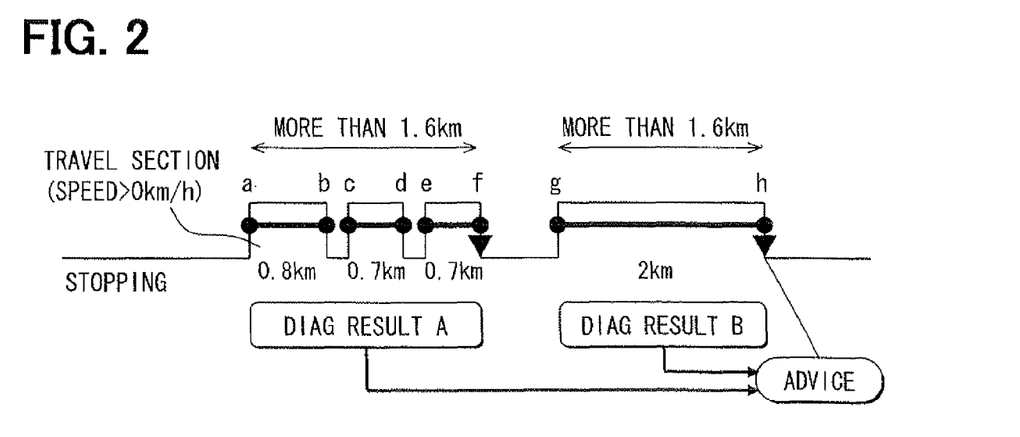
FIG. 2 is a time chart of advice generation timing about diagnosis items in a travel section comparison diagnosis method in the first embodiment.

In FIG. 2, a pulse shape time chart represents a travel condition and a travel distance of the vehicle. More practically, the time chart in FIG. 2 represents that a travel distance of 0.8 km and a stop and a travel distance of 0.7 km and a stop and a travel distance of 0.7 km and a stop and a travel distance of 2 km and a stop. The same representation scheme is used in FIGS. 4, 6, and 7 described later.

The diagnosis item of the travel section comparison type handles, as a unit section of evaluation (i.e., an evaluation section), a travel section from a start of a travel (i.e., a turning on of the ignition switch of the vehicle: a cumulative travel distance at the start of the travel is defined as 0) to a first stopping after the cumulative travel distance equal to or greater than 1.6 km, and the apparatus diagnoses the diagnosis item in that unit section. Then, at the end of the evaluation section after the performance of the evaluation, the cumulative travel distance is reset to 0. Thus, a new evaluation section starts at the end of the previous evaluation section, and the new evaluation section ends at the first stopping after traveling 1.6 km or more. The diagnosis of the diagnosis item is performed in the same manner in the new evaluation section.

The diagnosis result of each diagnosis item is calculated in the above-described manner for the travel of the vehicle, that is, for the time after turning-on to the turning-off of the ignition switch. The threshold of 1.6 km is defined as a standard small trip to a nearby shop or the like, based on the statistics.

In the example in FIG. 2, a point a is the start point (the cumulative travel distance=0), and the first stopping at a point b is at the distance of 0.8 km, which is smaller than 1.6 km, thereby not serving as the end point of the evaluation section. The situation is the same for a point d. Then, a point f at the distance of 2.2 km, which exceeds the threshold of 1.6 km, serves as an end point of the evaluation section according to the above definition.

Then, the travel of the vehicle is resumed at a point g that serves as a new start point, with the next stopping at a point h of the travel distance 2.0 (<1.6), making the point h to be eligible as the next end point of the evaluation section.

Then, as for the sections between the points a to f, a diagnosis result A corresponding to each of the diagnosis items is calculated and memorized, and as for the section between the points g and h, a diagnosis result B corresponding to each of the diagnosis items is calculated likewise and memorized.

At the point h, an advice is generated based on the diagnosis result by the diagnosis items which are classified into the travel section comparison type. More specifically, the diagnosis result B and the diagnosis result A are compared with each other, and the diagnosis result B is evaluated in a relative manner for generating the advice based on the evaluation result. In this case, at the point f, no advice is generated due to the lack of the diagnosis result to be compared with the diagnosis result A.

⟨Advice Generation Processing about the Diagnosis Item of the Travel Section Comparison Type⟩

The advice generation processing which is performed at the point h of FIG. 2 is described with reference to a flowchart in FIG. 3.

Figure 3:
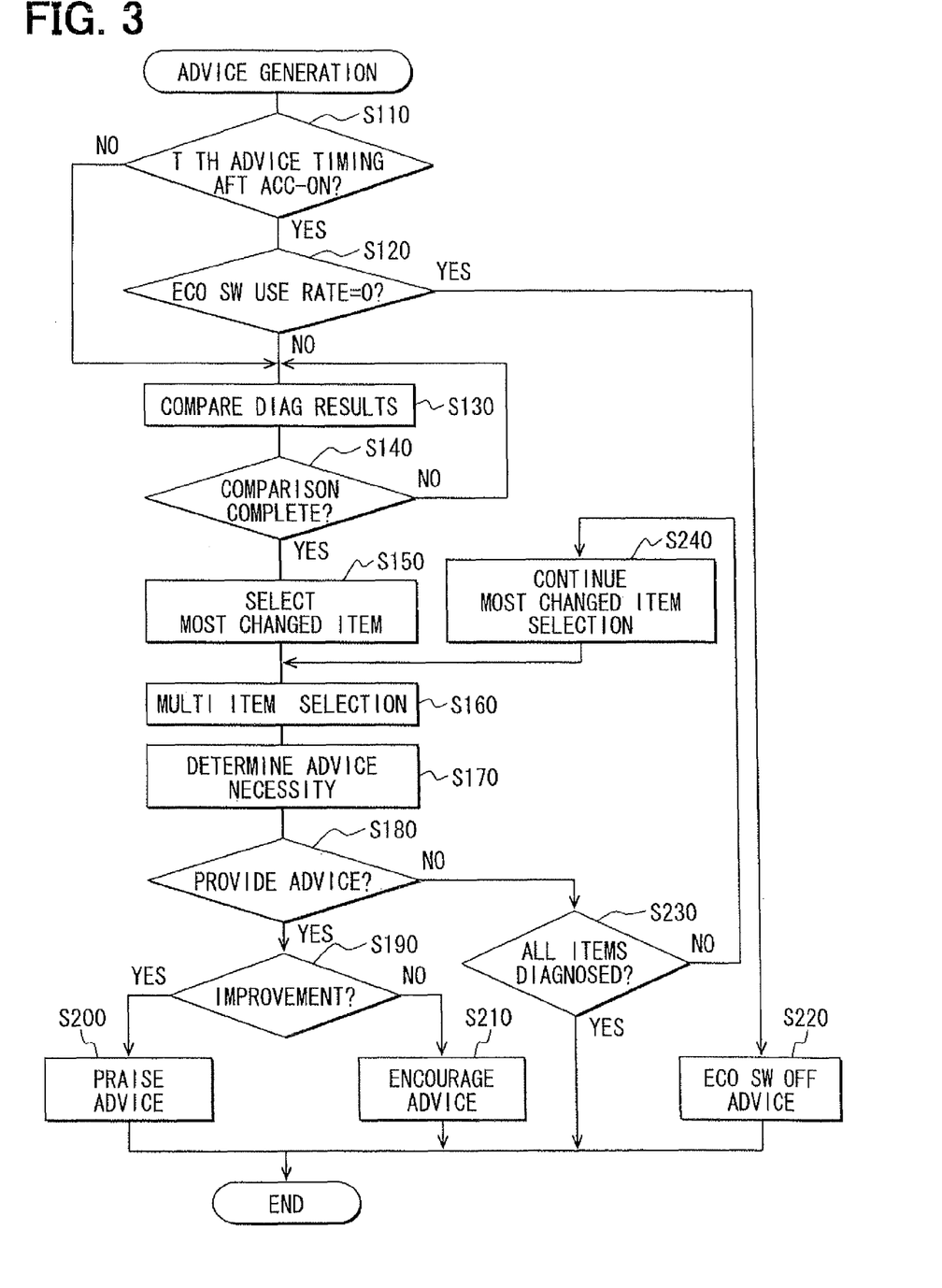
FIG. 3 is a flowchart of advice generation processing about diagnosis items in a travel section comparison diagnosis method in the first embodiment.

The advice generation processing of FIG. 3 is the processing which generates an advice about the diagnosis item which is classified into the travel section comparison type, and is performed by the control circuit 18. More specifically, the CPU (not illustrated in the drawing) in the control circuit 18 executes the processing.

At the start of the processing of FIG. 3, the process in S110 determines how many times the advice has been generated since turning-on of the accessory (ACC) switch (T th timing), and calculates the remainder of the number T after division by 5 (T/5). More practically, if the remainder is equal to 1 is determined.

If the remainder is determined as not equal to 1 (S110:NO), the process proceeds to S130.

On the other hand, the process proceeds to S120 when determining that the remainder from dividing T by 5 is equal to 1 (S110:YES).

In other words, according to the above calculation, once for every five times of the advice generation operation, the process executes the processing of S120. By the above calculation in S110, the frequent execution of S120 is prevented when the driver has intentionally turned off the eco-switch. In other words, frequent generation of eco-switch turning-on advice is prevented by the calculation of S110.

In S120, the process proceeds to S220 when determining that the ratio of travel distance with the eco-switch turned-on condition is equal to 0 in the current travel section between the points g and h in FIG. 2 (S120:YES).

In S220, the process generates an advice that indicates that the eco-switch is in an OFF condition. More practically, the process generates an advice that recommends turning on the eco-switch. The generated advice is displayed on the display unit 14 (see FIG. 10A/B) for the notification to the driver.

On the other hand, the process proceeds to S130 when determining that the ratio of the travel distance with the eco-switch turned-on condition is not equal to 0 in the current travel section (S120:NO).

In S130, the process calculates, for each of the diagnosis items, the difference between the diagnosis result (the diagnosis result A in FIG. 2) in the previous evaluation section and the diagnosis result (the diagnosis result B in FIG. 2) in the current evaluation section. For example, for the diagnosis item that determines whether the eco-lamp is turned on during the travel of the vehicle, the travel distance with the lamp turned-on condition in the previous section and the travel distance with the lamp turned-on condition in the current section are compared with each other, for the calculation of the difference of the distance.

In S140, the process determines whether all diagnosis items are examined in terms of comparison of the difference. If the comparison is not complete for a part of the diagnosis items (S140:NO), the process returns to S130.

On the other hand, the process proceeds to S150 when determining that the calculation of the difference has been complete for all of the diagnosis items in S140 (S140:YES).

In S150, the process determines the diagnosis item that has the maximum absolute difference value.

In S160, the process determines whether there are multiple diagnosis items that have the same maximum absolute difference value. If there are multiple diagnosis items having the same value, one of the most prioritized diagnosis item is selected from among those multiple items based on the predetermined priority assigned to the diagnosis items.

In S170, the process determines whether a provision of an advice is necessary for the diagnosis items selected in S150 or S160, based on the difference (between the previous evaluation section and the current evaluation section) and the diagnosis result of the current evaluation section. In other words, whether or not the driver should have an advice for the selected diagnosis item is determined.

For example, if the difference itself can be determined as relatively small while the difference takes the maximum absolute value, the advice provision does not have necessity. Further, even when the diagnosis result in the current evaluation section has deteriorated from the result in the previous evaluation section, the necessity of the advice provision is determined as low (or not necessary) if the diagnosis result exceeds a threshold.

In S180, whether or not to notify the advice to the driver is determined based on the determination result of S170. More practically, if the advice provision necessity is determined as low in S170, the process determines that no advice is provided for the driver (S180:NO), and the process proceeds to S230. If the necessity is determined to exist, the process determines that an advice is provided for the driver (S180:YES), and the process proceeds to S190.

In S190, the process proceeds to S200 when the driving condition is determined to have improved based on the diagnosis result of the previous and current evaluation sections (S190:YES).

In S200, the process generates an advice to praise the driving skill of the driver for the diagnosis item which has been selected in S150 or S160. The process displays the generated advice on the display unit 14 (see FIG. 10A/B, for example) for notifying the advice to the driver. Then, the process concludes itself.

On the other hand, the process proceeds to S210 when the driving condition is not determined to have improved, that is, when the driving condition has deteriorated (S190:NO).

In S210, the process generates an advice to improve the driving skill of the driver about the selected diagnosis item. The process displays the generated advice on the display unit 14 (see FIG. 10A/B, for example) for notifying the advice to the driver. Then, the process concludes itself.

In S230, whether or not all of the diagnosis items in the travel section comparison type have been diagnosed is determined. If the determination indicates that all items have been diagnosed (S230:YES), the process concludes itseft.

On the other hand, in S230, the process proceeds to S240 when determining that a part of the evaluation is not complete (S230:NO).

In S240, out of the diagnosis items that have not been evaluated, the process selects the diagnosis item that has been most changed (i.e., the difference between the previous and current section has the maximum absolute value). Then, the process proceeds to S160. The process of S160 and a subsequent portion have already been described.

⟨Single Section Type Diagnosis Item⟩

The diagnosis item of the single section type is described in the following.

The diagnosis item which is classified into the single section type includes the following items. That is, the single section type diagnosis item is suitably used to determine/evaluate a safety-related situation, in a quantitative manner. Further, frequent events having safety related characteristics and requiring advice generation can suitably be evaluated by the single section type diagnosis item. The contents of the quantitative evaluation are described with reference to FIG. 5.

The diagnosis item which is classified into this single section type includes, for example, a speed limit diagnosis, an acceleration diagnosis, a brake diagnosis, a stop-at-an-intersection diagnosis, an inter-vehicle distance diagnosis and the like. Details of the above items are described later.

In the speed limit diagnosis, a travel distance of the vehicle with the vehicle speed exceeding a speed limit in a predetermined travel section (travel distance) is calculated as a ratio. The calculation result is evaluated based on the standard value of the speed limit diagnosis. The speed limit information may be acquired from an image of the speed limit sign captured by a camera installed in the vehicle (not illustrated in the drawing). Further, the speed limit information may be acquired from VICS information service (i.e., a traffic information service implemented in JAPAN) through the VICS receiver 13. Further, the information may also be acquired from map data stored in the map database 11 if the database 11 has traffic regulation information. The speed of the vehicle is acquired from a speed sensor in the vehicle.

In the acceleration diagnosis, an acceleration of the vehicle is determined from the vehicle condition, and the number of over-the-threshold accelerations/jerks (i.e., a change rate of the acceleration) is calculated against the total number of accelerations/jerks for yielding a ratio. The calculation result is evaluated by the standard value of the acceleration diagnosis. The acceleration diagnosis may be evaluated based on a ratio of travel distance with the acceleration pedal (not illustrated) stepped down over a threshold against the travel distance of the vehicle.

In the brake diagnosis, the number of abrupt braking is counted. The number of counts is evaluated based on the standard value of the brake diagnosis. Whether or not a certain braking is the "abrupt braking" is determined based on the signals from the brake sensor and the acceleration sensor. For example, it is determined that the braking is "abrupt" when the operation stroke of the brake pedal per second (or a fixed time period) exceeds a threshold. The abrupt braking may also be determined based on the signal from the acceleration sensor that indicates the excess of deceleration relative to a deceleration threshold.

In the stop-at-an-intersection diagnosis, whether or not the vehicle has stopped at a position where all vehicles are expected to stop is diagnosed. Whether a certain position is the one where all vehicles should be stopping is determined based on the traffic information from the VICS receiver 13, or the traffic regulation information from the map database.

In the inter-vehicle distance diagnosis, a distance from a preceding vehicle that is traveling in the same traffic lane of the subject vehicle is measured, and a travel distance of the subject vehicle with the inter-vehicle distance of equal to or greater than a threshold is compared with the total travel distance for calculating the ratio. The calculation result is evaluated based on the standard value of the inter-vehicle distance diagnosis.

⟨Diagnosis Method for the Diagnosis Item of the Single Section Type⟩

The diagnosis method for the diagnosis item in the single section type and the advice generation timing based on the diagnosis result are described with reference to FIG. 4.

The definition of the evaluation section is same as the description of FIG. 2. The advice of the single section type diagnosis item is generated at the end of each of the evaluation section as shown in FIG. 4. That is, the situation in FIG. 4 describes that, at a point f, a diagnosis result C for the evaluation section defined by points a to f is calculated and generated, and, at the same time, an advice based on the diagnosis result C is generated. Similarly, at a point h, a diagnosis result D for the evaluation section defined by points g and h is calculated and generated, and, at the same time, an advice based on the diagnosis result D is generated.

⟨Advice Generation Processing about the Diagnosis Item of the Single Section Type⟩

Figure 4:
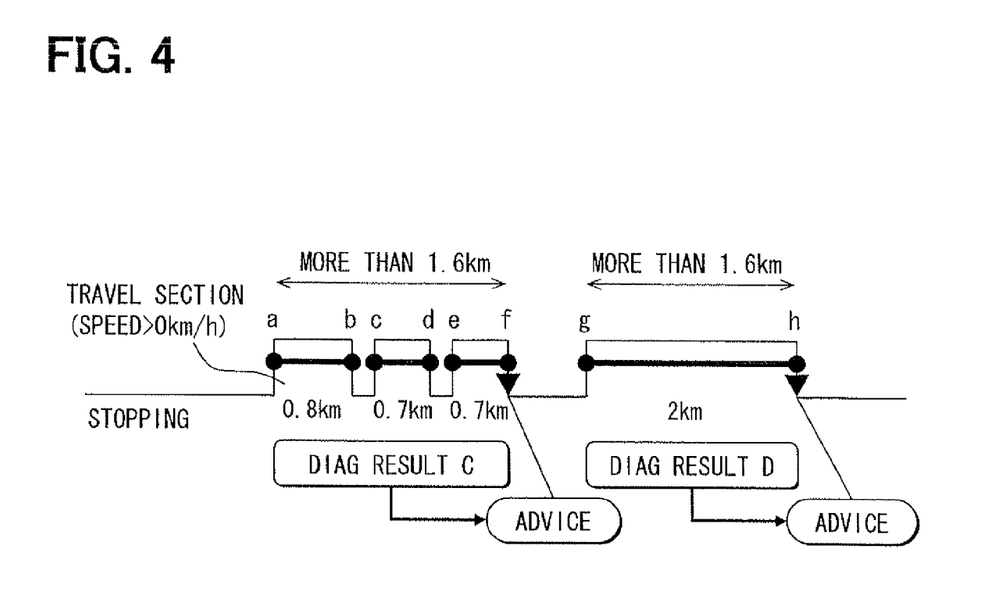
FIG. 4 is a time chart of advice generation timing about diagnosis items in a single section diagnosis method in the first embodiment.

The advice generation processing which is performed at the points f, h of FIG. 4 is described with reference to a flowchart in FIG. 5.

Figure 5:
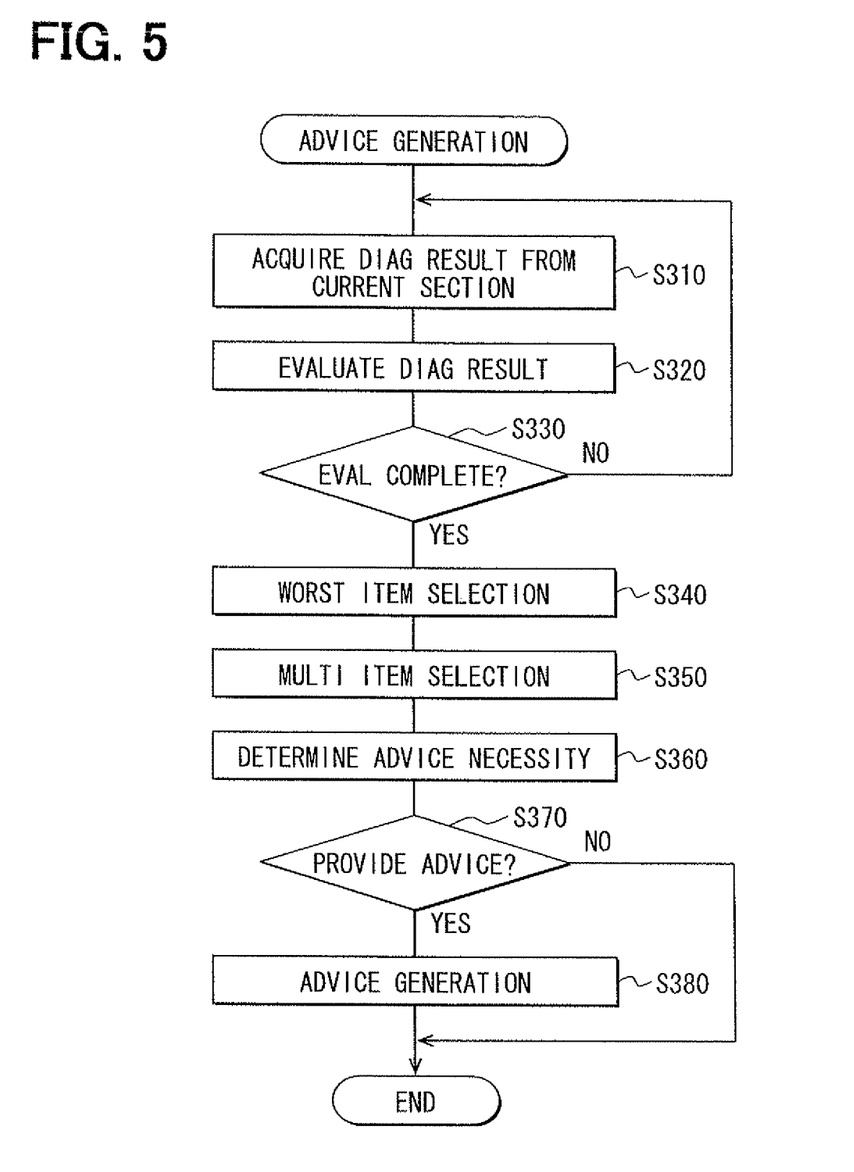
FIG. 5 is a flowchart of advice generation processing about diagnosis items in the single section diagnosis method or in a travel time event diagnosis method in the first embodiment.

The advice generation processing of FIG. 5 is the processing which generates an advice about the diagnosis item which is classified into the single section type. The same process also generates an advice for the diagnosis items of the travel time event type to be described later in the specification. The advice generation processing of FIG. 5 is performed by the control circuit 18. More specifically, the CPU (not illustrated in the drawing) in the control circuit 18 executes the processing.

When the processing of FIG. 5 is started, in S310, the process acquires the diagnosis result for the current evaluation section. That is, for example, if the processing is performed at the point f in FIG. 4, the process acquires the diagnosis result C, and, if the processing is performed at the point h in FIG. 4, the process acquires the diagnosis result D.

Then, in S320, based on the diagnosis result acquired in S320, evaluation is performed for each of the diagnosis items. More practically, the evaluation of the diagnosis result ranks the diagnosis results for each of the diagnosis items. That is, the diagnosis result of a certain diagnosis items is ranked to have a lower position when the count of non-safe acts below an evaluation standard has higher ratio in all evaluable acts (i.e., events) in the evaluation section. In this manner, the events are evaluated quantitatively.

Then, in S330, the process determines whether all diagnosis items have been evaluated or not. If the evaluation has not been complete (S330:NO), the process returns to S310 again.

On the other hand, the process proceeds to S340 when determining that all diagnosis items have been evaluated (S330:YES).

In S340, the process selects a diagnosis item whose rank is worst (i.e., lowest) among all diagnosis items.

In S350, the process determines whether there are multiple diagnosis items in the worst rank of the evaluation. Further, if there are multiple items, an item that has the highest priority is selected from the multiple items according to the pre-assigned item priority.

In S360, the process determines, for the diagnosis items selected in S340 or S350, if the driving condition is categorized as an unsafe driving, based on the comparison between the evaluation value (e.g., the rank of the diagnosis item) and the standard value. Further, the determination regarding the unsafe driving is utilized for determining whether or not a provision of an advice is necessary. For example, if the count of the unsafe driving scenes below the evaluation standard exceeds 75% of the number of all scenes in a certain evaluation section, the driving condition is determined as the "unsafe driving."

That is, it is determines that the advice provision/generation is necessary when the driving condition is determined as unsafe, and the advice provision/generation is not necessary when the driving condition is not unsafe.

In S370, whether to provide an advice is determined based on the determination result in S360. More practically, if the process has determined that the advice provision not is necessary in S360, the process concludes itseft without providing the advice for the driver (S370:NO), and, if the process has determined that the advice provision is necessary in S360, the advice will be provided for the driver (S370:YES), before proceeding to S380.

In S380, for the diagnosis items selected in S340 or S350, the process generates an advice in an attempt for improving the driving skill of the driver. The generated advice is displayed on the display unit 14 (see FIG. 10, for example) for notification for the driver. The process concludes itself after the advice notification.

⟨Travel Time Event Type Diagnosis Item⟩

The diagnosis item of the travel time event type is described in the following.

The diagnosis item which is classified into the travel time event type includes the following items. That is, a diagnosis item for diagnosing a safety-related event for which an advice should immediately be generated at the next stopping time even when the event takes place only once during the travel of the vehicle.

As the diagnosis item which is classified into the travel time event type, a diagnosis item for diagnosing use of the seat belt, for diagnosing use of light in tunnel, for diagnosing use of light in an early hour, or the like is included.

In the seat belt use diagnosis, whether a seat belt is worn based on the signal from the sensor that detects the use of the seat belt is determined. More practically, the use of the seat belt is determined when the gear is shifted to a position other than P, R and N and the speed of the vehicle is over a certain threshold.

In the light use in the tunnel diagnosis, whether or not the light is used in the tunnel is diagnosed. In this case, whether the vehicle is traveling in the tunnel (i.e., whether the vehicle has entered the tunnel) is determined based on the signal from the luminosity sensor. The entrance into the tunnel may be determined based on the current position of the vehicle derived from the GPS receiver together with the road data in the map database 11.

In the early light use diagnosis, whether or not the light is used in an early hour (i.e., in a recommended time slot) is determined. The recommended time slot is determined based on the sun set time that can be calculated from the latitude/longitude, the time of the day and the day/month in the year.

⟨Diagnosis Method for the Diagnosis Item of the Travel Time Event Type⟩

The diagnosis method for the diagnosis item in the travel time event type and the advice generation timing based on the diagnosis result are described with reference to FIG. 6.

Figure 6:
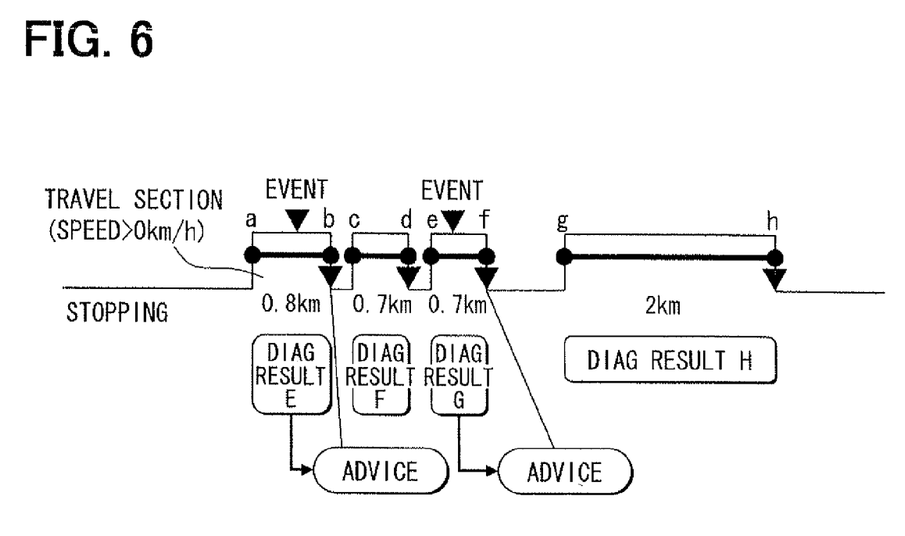
FIG. 6 is a time chart of advice generation timing about diagnosis items in the travel time event diagnosis method in the first embodiment.

As for the diagnosis item which is classified into the travel time event type, the diagnosis result is generated and memorized for every evaluation section that is defined as a section from a start of the vehicle's travel to a stop of the travel as shown in FIG. 6, irrespective of the travel distance.

More practically, a diagnosis result E is generated and memorized for an evaluation section between a point 'a' and a point 'b,' and a diagnosis result F is generated and memorized for an evaluation section between a point 'c' and a point 'd.' In the same manner, a diagnosis result G is generated and memorized for an evaluation section between a point 'e' and a point 'f,' and a diagnosis result H is generated and memorized for an evaluation section between a point 'g' and a point 'h.'

Then, at the end of the evaluation section, the advice generation processing is performed. The advice generation processing is described in FIG. 5.

For example, when a phenomenon (i.e., an event) on which an advice should be provided takes place in an evaluation section, an advice is generated and notified to the driver at the end of the evaluation section (e.g., at the points 'b' and 'f'). If there is no event in the evaluation section, no advice is generated and notified at the end of the evaluation section.

⟨Stop Time Event Type Diagnosis Item⟩

The diagnosis item of the stop time event type is characterized as follows.

The diagnosis item which is classified into the stop time event type includes the following items. That is, the diagnosis items of the stop time event type are diagnosed at the time of stopping of the vehicle or during the stopping of the vehicle. Further, the diagnosis items of the above type is about a frequent event during the stopping of the vehicle The diagnosis item of the stop time event type may include, for example, a gunning diagnosis, an idle diagnosis, and the like. Details of those diagnoses are described later.

In the gunning diagnosis, whether the gunning of the engine is performed during the stopping of the vehicle is determined.

In the idle diagnosis, whether time of idling exceeds a threshold during the stopping of the vehicle is determined.

⟨Diagnosis Method for the Diagnosis Item of the Stop Time Event Type⟩

The diagnosis method for the diagnosis item in the stop time event type and the advice generation timing based on the diagnosis result are described with reference to FIG. 7.

Figure 7:
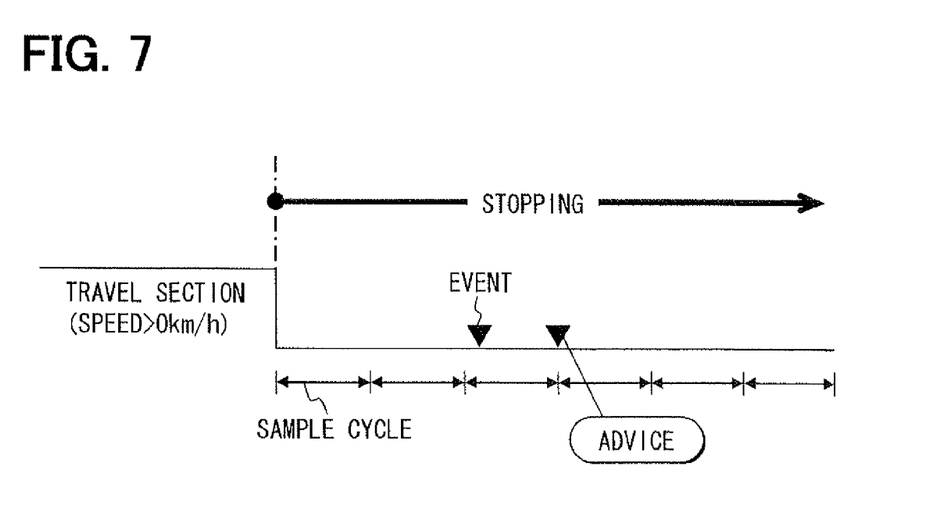
FIG. 7 is a time chart of advice generation timing about diagnosis items in a stop time event diagnosis method in the first embodiment.

The diagnosis item which is classified into the stop time event type is shown in FIG. 7. The diagnosis is performed during a predetermined evaluation period having a certain cycle time. At the end of the evaluation period, advice generation is performed, which is mentioned later with reference to FIG. 8. That is, for example, an advice is generated at the end of the evaluation period and the advice is notified if a relevant event, that is, an advise-prone phenomenon on which an advice should be provided, takes place during the evaluation period. On the other hand, if no event takes place during the evaluation period, no advice is generated at the end of the evaluation period.

⟨Advice Generation Processing about the Diagnosis Item of the Stop Time Event Type⟩

The advice generation processing which is performed at the end of the evaluation period is described with reference to FIG. 8.

Figure 8:
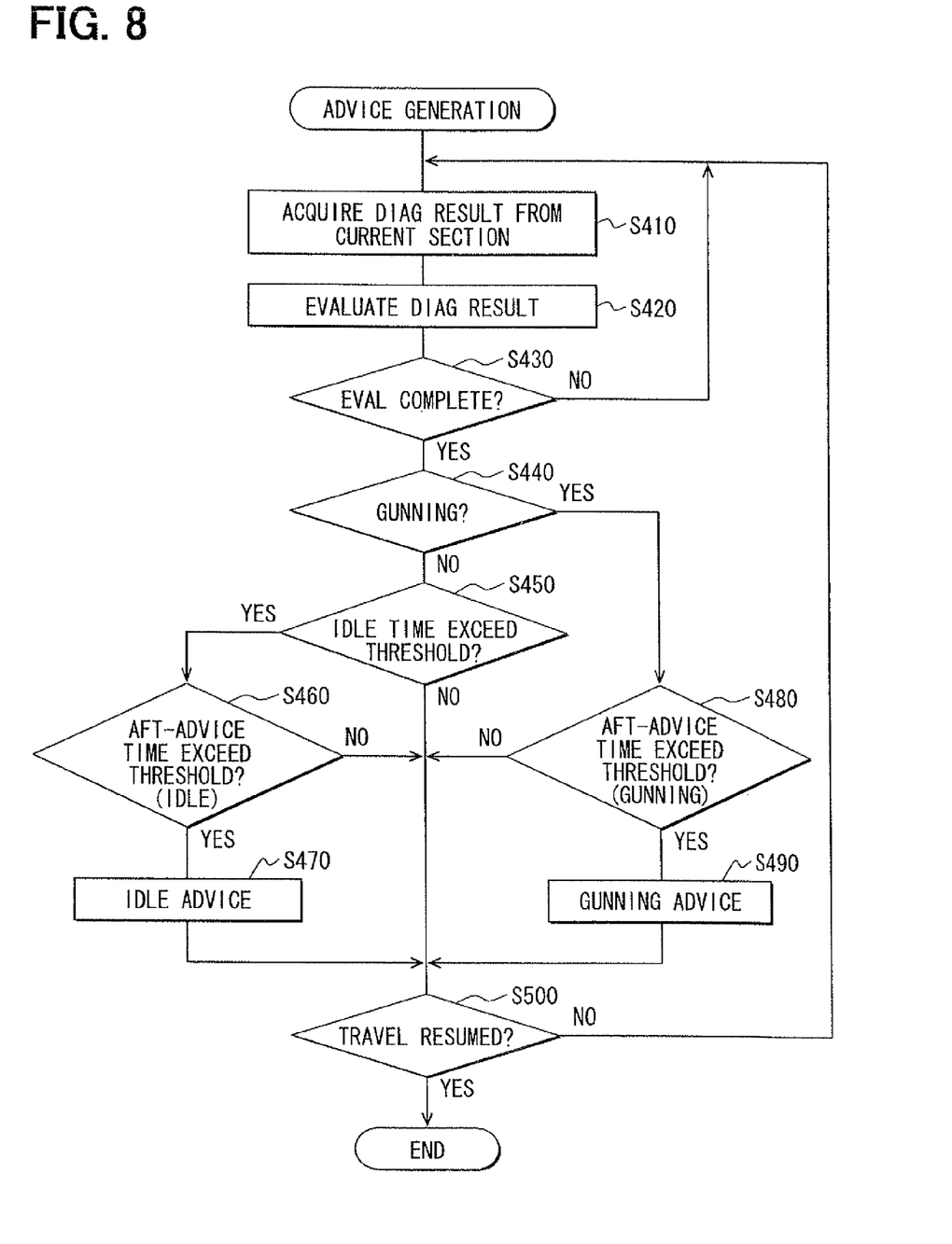
FIG. 8 is a flowchart of advice generation processing about diagnosis items in the stop time event diagnosis method in the first embodiment.

The advice generation processing of FIG. 8 is repeated while the ignition switch is turned ON during the stopping of the vehicle, at an interval of sampling period.

In this case, a CPU (not illustrated in the figure) in the control circuit 18 performs the advice generation processing of FIG. 8.

First, when the processing of FIG. 8 is started, in S410, the process acquires a diagnosis result from a current cycle of the evaluation period. That is, in other words, the diagnosis result from currently traveled section is acquired Then, in S420, based on the acquired diagnosis result in S410, an evaluation is performed for each of the diagnosis items.

Then, in S430, whether all of the diagnosis items have been evaluated is determined. If a part or all of the diagnosis items have not been evaluated (S430:NO), the process returns to S410.

On the other hand, the process proceeds to S440 when determining that evaluation of all diagnosis items has been completed in S430 (S430:YES).

In S440, the process determines whether or not the gunning is performed based on the evaluation result of S420, and proceeds to S450 if determining that the gunning has not been performed (S440:NO).

In S450, the process determines whether the idle time exceeds a threshold, and proceeds to S500 when determining that the idle time does not exceeds the threshold (S450:NO).

In S500, the process determines whether the vehicle has started/resumed, and concludes itself if determining that the travel has been started/resumed (S500:YES).

On the other hand, the travel of the vehicle is determined as not started/resumed (S500:NO), the process returns to S410 again.

Further, the process proceeds to S460 when determining that the idle time has exceeded the threshold (S450:YES).

In S460, the process determines whether or not a time after generation of the previous advice regarding the idling exceeds a threshold, and proceeds to S500 when determining that the time does not exceed the threshold (S460:NO). On the other hand, the process proceeds to S470 when determining that the time has exceeded the threshold (S460:YES).

In S470, an advice is generated regarding the idle diagnosis for the purpose of improving the driving skill of the driver. For example, an advice that warns continuation of the idling may be generated. The generated advice is then displayed on the display unit 14 (see FIG. 10B, for example) for the notification to the driver. Then, the process proceeds to S500.

When the process determines that the gunning is performed in S440 (S440:YES), the process proceeds to S480. Then, the process determines whether a time after the previous advice regarding the gunning exceeds a threshold. If the time after the previous advice does not exceed the threshold (S480:NO), the process proceeds to S500. If the time after the previous advice exceeds the threshold (S480:YES), the process proceeds to S490.

In S490, the process generates an advice for the purpose of improving the driving skill of the driver based on the gunning diagnosis. For example, the process generates an advice that warns the gunning. The generated advice is then displayed on the display unit 14 (see FIG. 10B, for example) for the notification to the driver. Then, the process proceeds to S500.

As has been explained in the present embodiment, a diagnosis item is classified into a travel section comparison type, a single section type, a travel time event type, and a stop time event type, and the diagnosis items is diagnosed according to the suitable diagnosis method. Further, the advice is notified to the driver at a suitable timing according to the type of the diagnosis item.

Therefore, the advice based on the diagnosis result of the diagnosis item is notified to the driver at a suitable timing, thereby achieving an improvement of effectiveness of the advice notification to the driver.

For example, the multiple advices are provided at respectively different timings to the driver as a result, thereby enabling a non-overlapping notification of each of the multiple advices.

Each of the multiple advices is, therefore, effectively conveyed to the driver because a situation such as a delayed advice provision, a down-pour of many advices can be avoided, according to the operation scheme of the present disclosure.

The correspondence of the components to the claim language is as follows. That is, various sensors 20 and the vehicle I/F 19 correspond to an information acquisition unit, the control circuit 18 corresponds to a diagnosis unit, processing in S200, S210, S220, S380, S470, S490 corresponds to an advice generation unit and a notification unit, diagnosis items in the travel section comparison type (an eco-lamp diagnosis, an eco-switch diagnosis, an air-conditioner diagnosis, an accel-off diagnosis, an eco-advice diagnosis) and diagnosis items in the stop time event type (a gunning diagnosis, an idle diagnosis) correspond to environment-related diagnosis items, and diagnosis items in the single section type (a speed limit diagnosis, an acceleration diagnosis, a brake diagnosis, a stop-at-an-intersection diagnosis, an inter-vehicle distance diagnosis) and diagnosis items in the travel time event type (a seat belt diagnosis, a in-tunnel light diagnosis, an early light diagnosis) correspond to safety-related diagnosis items.

The advice generation timing may still be separated and segregated among the multiple advices in a different manner, in terms of providing an advice for each of respective device operations at different timings. Therefore, a different operation scheme is proposed in the following embodiment.

Second Embodiment

Figure 9:
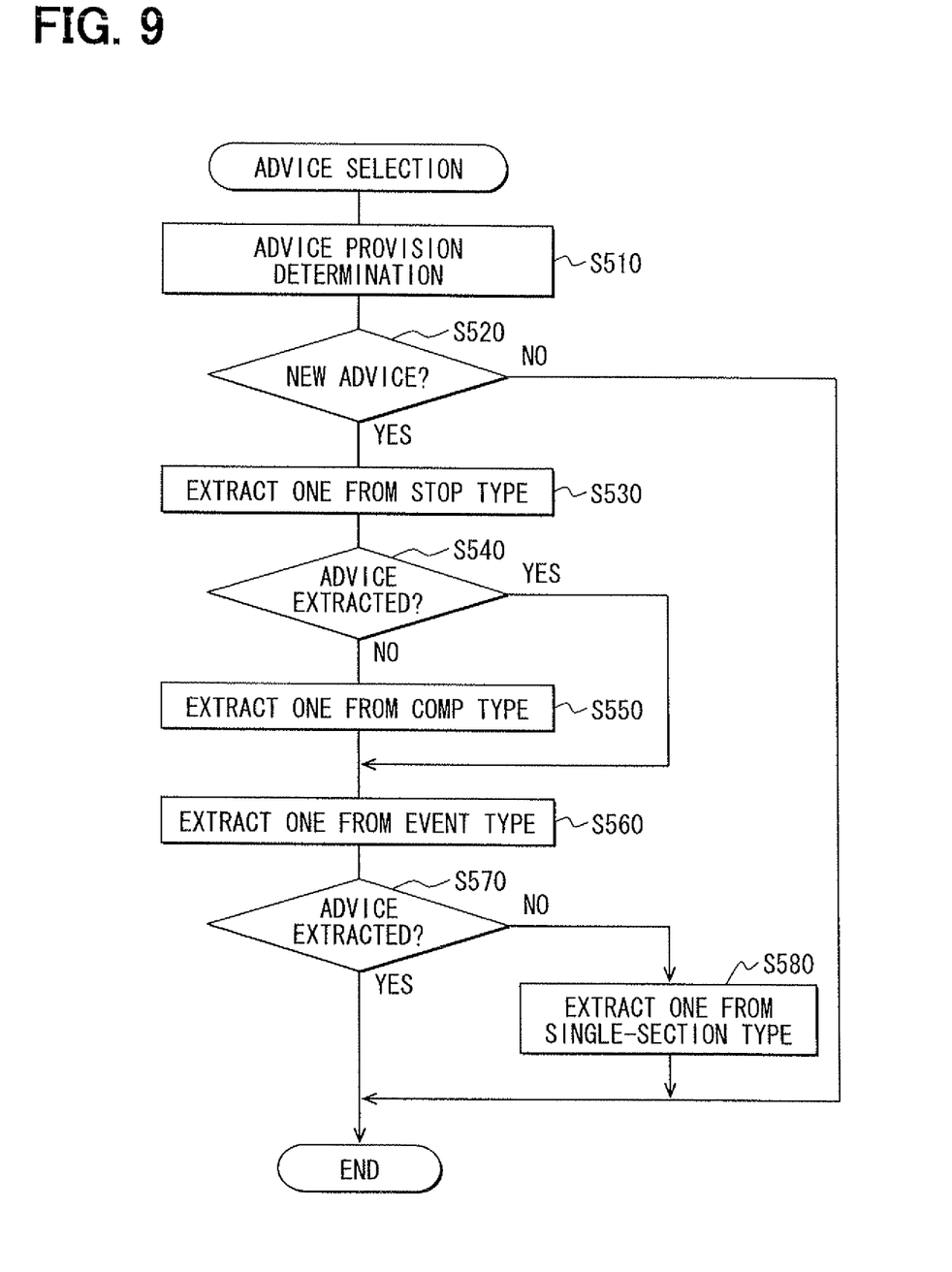
FIG. 9 is a flowchart of advice selection processing of the driving advice provision apparatus in a second embodiment of the present disclosure.

In the second embodiment, the different point relative to the first embodiment is that the control circuit 18 executes the processing of FIG. 9.

The processing of FIG. 9 is started when the advice generation processing (FIGS. 3, 5, 8) of four types (i.e., a travel section comparison diagnosis method, a single section diagnosis method, a travel time event diagnosis method, a stop time event diagnosis method) is ended.

In S510 of the processing of FIG. 9, whether a new advice has been generated and provided is determined in the advice generation processing of the four methods, that is, a travel section comparison diagnosis method, a single section diagnosis method, a travel time event diagnosis method, or a stop time event diagnosis method.

Then, in S520, new advice generation is determined based on the result in S510. If the new advice has not been generated (S520:NO), the process concludes itself.

On the other hand, the process proceeds to S530 if the new advice has been generated (S520:YES).

Then, in S530, the process extracts one piece of advice about the diagnosis item which is classified into the stop time event type (i.e., an item determined by the stop time diagnosis method). More specifically, an advice of the above type is tried to be extracted.

Then, in S540, the process determines whether the advice regarding the stop time event type has been extracted. If the advice of the stop type has been extracted (S540:YES), the process proceeds to S560.

On the other hand, the process proceeds to S550 when the advice has not been extracted in S540 (S540:NO).

In S550, the process extracts one piece of advice about the diagnosis item which is classified into the travel section comparison type (i.e., an item determined by the travel section comparison diagnosis method). More specifically, an advice of the above type is tried to be extracted. Then, the process proceeds to S560.

In other words, in S530 to S550, the process extracts one piece of advice about the diagnosis item regarding the environment. More specifically, the process extracts (i.e., uses), in a prioritized manner, the advice about the diagnosis item which is classified into the stop time event type in comparison to the advice regarding the travel section comparison type.

In S560, the process extracts one piece of advice about the diagnosis item which is classified into the travel time event type (i.e., an item determined by the travel time event diagnosis method). More specifically, an advice of the above event type is tried to be extracted.

Then, the process proceeds to S570, and determines whether the advice has been extracted. If the advice has been extracted (S570:YES), the process concludes itself.

On the other hand, if the advice has not been extracted (S570:NO), the process proceeds to S580, and extracts one piece of advice which is classified into the single section type (i.e., an item determined by the single section diagnosis method). Then, the process concludes itself.

In other words, in S560 to 580, the process extracts one piece of advice about the diagnosis item regarding the safely. More specifically, the process extracts (i.e., uses), in a prioritized manner, the advice about the diagnosis item which is classified into the travel time event type in comparison to the advice regarding the single section type.

Figure 10A:
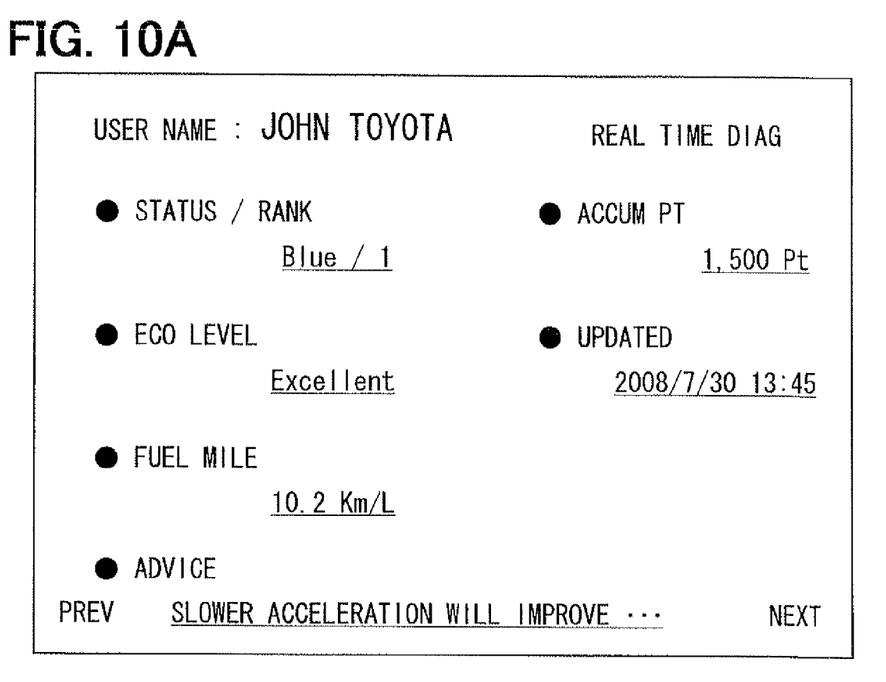
FIGS. 10A and 10B are illustrations of advice display in the first and second embodiments of the present disclosure.
Figure 10B:
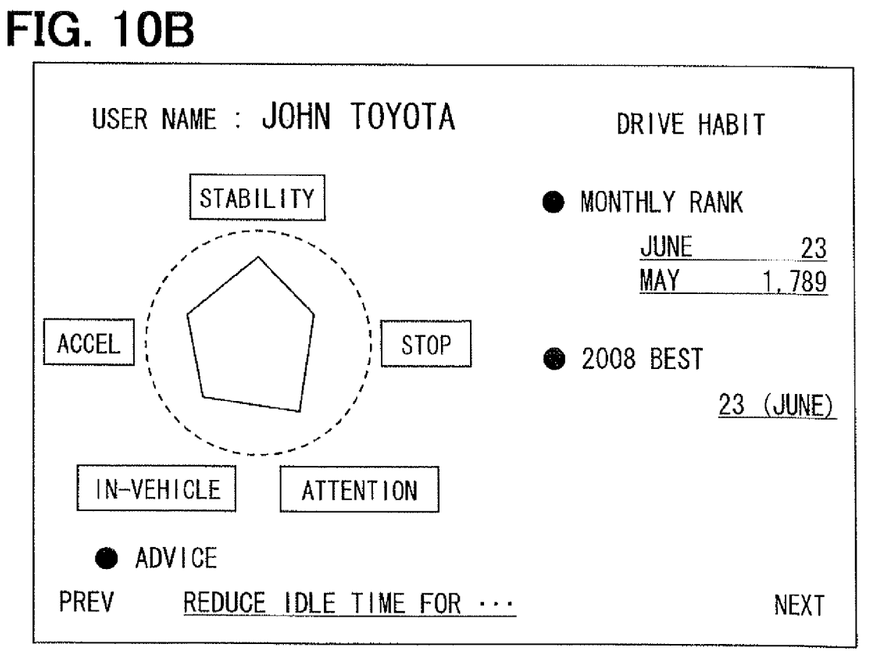

The extracted advice is displayed on the display unit 14 for the notification to the driver as shown in FIGS. 10A and 10B.

The advantages of the second embodiment are summarized as the prioritization of the multiple pieces of advice generated under a certain circumstance in terms of the simple and effective notification to the driver.

In the present embodiment, the processing of S530 to 580 of FIG. 9 is equivalent to an advice selection unit.

Although the present disclosure has been fully described in connection with preferred embodiment thereof with reference to the accompanying drawings, it is to be noted that various changes and modifications will become apparent to those skilled in the art.

For example, the advice may be audibly provided to the driver through the sound output unit 15.

Further, the display of the advice on the display unit 14 may be audibly notified to the driver from the sound output unit 15, for drawing the driver's attention. The advice of emergency may be more effectively provided to the driver in this manner.

Such changes, modifications, and summarized scheme are to be understood as being within the scope of the present disclosure as defined by appended claims.

What is claimed is:

1. A driving advice provision apparatus comprising:
an information acquisition unit for acquiring vehicle information that represents a condition of a vehicle;
a diagnosis unit for diagnosing on diagnosis items regarding a driving condition of the vehicle based on the vehicle information acquired by the information acquisition unit;
an advice generation unit for generating an advice to be provided for a driver of the vehicle based on a diagnosis result by the diagnosis unit;
a notification unit for notifying the advice for the driver of the vehicle generated by the advice generation unit, wherein
the diagnosis items are multiple items of diagnosis,
the diagnosis unit uses a diagnosis method that is suitable for respective items of diagnosis,
the advice generation unit notifies the advice at a timing that is suitable for respective items of diagnosis,
the notification unit notifies the generated advice at a time of stopping the vehicle or during a stopping of the vehicle,
the notification unit includes an advice selection unit that at least selects an advice having a high priority assigned to each of the advices in advance,
the notification unit notifies the driver of the vehicle of the advice selected by the advice selection unit in a prioritized manner,
the advice generation unit generates the advice at a time of stopping the vehicle or during a stopping of the vehicle,
the multiple items of diagnosis includes environment-related diagnosis items and safety-related diagnosis items,
the advice selection unit selects a high priority environment-related advice having the highest priority from among the generated advices on the environment-related diagnosis items, and selects a high priority safety-related advice having the highest priority from among the generated advices on the safety-related diagnosis items, and
the notification unit notifies the driver of the high priority environment-related advice and the high priority safety-related advice.

2. The driving advice provision apparatus of claim 1, wherein
the advice selection unit selects the high priority environment-related advice first, and then selects the high priority safety-related advice.

3. The driving advice provision apparatus of claim 1, wherein
the environment-related diagnosis items include (a) diagnosis items that are diagnosed by a travel section comparison diagnosis method that compares a target travel section with other travel section and (b) diagnosis items that are diagnosed by a stop time event diagnosis method that diagnoses a generation condition of an event that is possibly generated during the stopping of the vehicle, and
the safety-related diagnosis items include (a) diagnosis items that are diagnosed by a single section diagnosis method that diagnoses a driving condition of the target travel section based on a travel of the target travel section and (b) diagnosis items that are diagnosed by a travel time event diagnosis method that diagnoses a generation condition of an event that is possibly generated during a travel of the vehicle.

4. The driving advice provision apparatus of claim 3, wherein
among the environment-related diagnosis items, the advice concerning the diagnosis items diagnosed by the stop time event diagnosis method has higher priority than the advice concerning the travel section comparison diagnosis method, and
among the safety-related diagnosis items, the advice concerning the diagnosis items diagnosed by the travel time event diagnosis method has higher priority than the advice concerning the single section diagnosis method.

5. The driving advice provision apparatus of claim 4, wherein
each of the four diagnosis methods includes multiple diagnosis items, and
the generated advice concerning each of the multiple diagnosis items has a preset priority.

6. A driving advice provision apparatus comprising:
an information acquisition unit for acquiring vehicle information that represents a condition of a vehicle;
a diagnosis unit for diagnosing on diagnosis items regarding a driving condition of the vehicle based on the vehicle information acquired by the information acquisition unit;
an advice generation unit for generating an advice to be provided for a driver of the vehicle based on a diagnosis result by the diagnosis unit;
a notification unit for notifying the advice for the driver of the vehicle generated by the advice generation unit, wherein
the diagnosis items are multiple items of diagnosis,
each of the multiple items is categorized according to a method of diagnosis of the each of the multiple items,
the diagnosis unit performs diagnosis of each of the multiple items by a method that is suitable to a category of the each of the multiple items,
the advice generation unit generates, for each of the multiple items, an advice that is suitable to the category of the each of the multiple items, the notification unit notifies the generated advice at a time of stopping the vehicle or during a stopping of the vehicle, the notification unit includes an advice selection unit that at least selects an advice having a high priority assigned to each of the advices in advance, the notification unit notifies the driver of the vehicle of the advice selected by the advice selection unit in a prioritized manner, the advice generation unit generates the advice at a time of stopping the vehicle or during a stopping of the vehicle, the multiple items of diagnosis includes environment-related diagnosis items and safety-related diagnosis items, the environment-related diagnosis items and the safety-related diagnosis items are classified into respectively different diagnosis methods, the advice selection unit selects a high priority environment-related advice having the highest priority from among the generated advices on the environment-related diagnosis items, and selects a high priority safety-related advice having the highest priority from among the generated advices on the safety-related diagnosis items, and the notification unit notifies the driver of the high priority environment-related advice and the high priority safety-related advice.

7. The driving advice provision apparatus of claim 6, wherein the advice selection unit selects the high priority environment-related advice first, and then selects the high priority safety-related advice.

8. The driving advice provision apparatus of claim 6, wherein the environment-related diagnosis items include (a) diagnosis items that are diagnosed by a travel section comparison diagnosis method that compares a target travel section with other travel section and (b) diagnosis items that are diagnosed by a stop time event diagnosis method that diagnoses a generation condition of an event that is possibly generated during the stopping of the vehicle, and the safety-related diagnosis items include (a) diagnosis items that are diagnosed by a single section diagnosis method that diagnoses a driving condition of the target travel section based on a travel of the target travel section and (b) diagnosis items that are diagnosed by a travel time event diagnosis method that diagnoses a generation condition of an event that is possibly generated during a travel of the vehicle.

9. The driving advice provision apparatus of claim 8, wherein among the environment-related diagnosis items, the advice concerning the diagnosis items diagnosed by the stop time event diagnosis method has higher priority than the advice concerning the travel section comparison diagnosis method, and among the safety-related diagnosis items, the advice concerning the diagnosis items diagnosed by the travel time event diagnosis method has higher priority than the advice concerning the single section diagnosis method.

10. The driving advice provision apparatus of claim 9, wherein each of the four diagnosis methods includes multiple diagnosis items, and the generated advice concerning each of the multiple diagnosis items has a preset priority.

\* \* \* \* \*